United States Patent Office 2,839,417
Patented June 17, 1958

2,839,417

STABILIZED SOIL COMPOSITIONS CONTAINING REACTION PRODUCTS OF LIGNIN WITH POLYALKYLENE POLYAMINES

William F. Tousignant and Harold F. Byslma, Midland, Mich., assignors to The Dow Chemical Company, Midland, Mich., a corporation of Delaware No Drawing. Application May 7, 1956
Serial No. 582,936

6 Claims. (Cl. 106—123)

This invention relates to, and has for its purpose, the provision of physically bound and solidified soil compositions, particularly argilliferous compositions, that have been conditioned and stabilized against disintegration so as to integrously remain relatively hard, cohesive and compact, especially upon subjection, and even after prolonged exposure, to water.

According to the invention, a stabilized soil composition is comprised of soil, particularly argillaceous soil, that has incorporated therein a minor proportion of a cementatory caustic treated and solubilized polymeric alkylene polyamine precipitate of lignin sulfonic acids. Generally less than 2.0 percent by weight, based on the weight of the composition, of the cementatory precipitate is required to stabilize the soil. Advantageously, between about 0.25 and 1.0 percent by weight of the caustic treated polymeric alkylene polyamine precipitate of lignin sulfonic acids may be employed. The incorporation of greater quantities than those indicated of the caustic treated precipitate does not tend to amplify the desired effect an may even engender an opposite influence. Thus, for example, when about 10 percent or more by weight of the treated precipitate is incorporated in a soil composition, it may be found to confer friable, non-compacting characteristics thereto. Preferably, the compositions of the invention may be provided by a method which comprises incorporating a caustic aqueous solution of the polymeric alkylene polyamine precipitate of lignin sulfonic acids with the soil to be stabilized and, advantageously, drying, or permitting to dry, the resulting composition.

The present invention may advantageously be practiced in order to condition and harden the surface of argillaceous soils to improve their transient load bearing and deformation resisting characteristics, especially under wet conditions. Its practice may be particularly beneficial to consolidate soil for roadway construction purposes, automotive and other parking and storage grounds and the like as well as for the treatment and maintenance of certain earthen recreational areas such as clay tennis cours, sports arenas and similar installations.

The precipitate which is caustic treated and solubilized for utilization in the practice of the present invention may be obtained readily by precipitating lignin sulfonic acids from spent or waste sulfite liquor with a polymeric alkylene polyamine precipitating agent. The spent sulfite liquor, which is a major by-product of various digestion processes in the manufacture of wood pulp, may be of any desired type from any source. A calcium base softwood spent sulfite liquor that contains in the neighborhood of 6 or 7 percent by weight of lignin sulfonic acids may, for example, be employed beneficially.

The polymeric alkylene polyamine precipitating agent for the lignin sulfonic acids may advantageously be the reaction product between a lower alkylene chloride and a polyamine or a polyamine material that consists of a mixture of polyamines having the general formula:

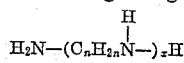

wherein $n$ may be an integer from 2 to 3 and $x$ may have a numerical value of at least 2 and frequently from 2 to 6. It is generally beneficial for the polymeric reaction product to have a molecular weight of at least about 250 and, in many cases, it is advantageous for its molecular weight to be between about 250 and 1,000. While polymeric reaction products that have greater molecular weights may be employed as precipitants for lignin sulfonic acids, they frequently may cause a slimy, pultaceous precipitate to form that may be difficult to handle and troublesome to filter. It is usually desirable for the polymeric reaction product to be prepared from about equimolar proportions of an alkylene chloride, such as ethylene chloride, and diethylenetriamine which may, for example, be the preponderant constituent in a polyamine mixture that consists of several homologous polyamines including triethylene tetramine and higher like polyamines.

Ordinarily, a precipitate that contains between about 5 and 20 percent by weight of the polymeric alkylene polyamine precipitant may be obtained from the spent sulfite liquor. This depends, of course, on the respective molecular weight of the polymeric alkylene polyamine precipitating agent that has eben employed and on the molecular weight range of the lignin sulfonic acids that are precipitated from the spent sulfite liquor. Since the lignin sulfonic acids which occur in spent sulfite liquor are distributed in a mixture over a range of molecular weights, their influence on the precipitate due to molecular weight also depends somewhat upon the extent towards completeness of their precipitation from the spent sulfite liquor or the precipitation efficiency which has been accomplished. Frequently, the formed precipitate may contain in the neighborhood of 10 percent by weight of the polymeric alkylene polyamine precipitant. The polymeric alkylene polyamine precipitate of lignin sulfonic acids is usually obtained as a cream to brown color solid having a melting point of about 300° C. which is soluble in aqueous caustic and ammonia solutions but insoluble in most organic solvents.

Advantageously, the polymeric alkylene polyamine precipitaee of lignin sulfonic acids may be caustic treated an solubilized by dissolving it in an alkali metal hydroxide solution such as sodium hydroxide. The thus-obtained caustic solution of the precipitate, as mentioned, may be directly employed for preparing the compositions of the present invention.

By way of further illustration, about 3,500 milliliters of calcium base softwood spent sulfite liquor containing about 10.2 percent by weight of solids and in the neighborhood of 6.5 percent by weight of dissolved lignin sulfonic acids, was added to a 250 milliliter volume of an aqueous polymeric alkylene polyamine solution which contained about 42.0 grams of the polymeric material having a solids content of about 67 percent by weight. The polymeric alkylene polyamine which was employed was the reaction product, in about equimolar proportions, of ethylamine dichloride with a polyamine mixture that consisted of about 80 percent by weight of diethylenetriamine, 10 percent by weight of triethylenetetramine and 10 percent by weight of higher homologous polyamines. A precipitate was formed in the spent sulfite liquor which was removed by filtration, washed several times with water and dried in air for about 24 hours. Approximately 120 grams of the dried precipitate was obtained. About 100 grams of the thereby-obtained precipitate, 7.4 grams of sodium hydroxide and 987 milliliters of water were mixed to yield a solution of hte caustic treated and solubilized polymeric alkylene polyamine precipitate of lignin sulfonic acids that contained about 10 percent by weight of dissolved solids.

The solution was then used for preparing several stabilized clay soil compositions in accordance with the invention with a river bottom clay that had been obtained from the bed of the Tittabawassee River in Midland County, Michigan. Each of the compositions was prepared by mixing the clay with a small proportion of the caustic treated precipitate solution with enough water to make a thick paste which was formed in the shape of a ½ x 2 x 2 inch specimen and dried for about 15 hours at 225° F. to a hard cake. About a 2 gram portion of each of the dried compositions was then placed in a beaker containing about 50 milliliters of water and the time that was required for its disintegration was noted. The results are given in the following table, which includes the amount of the ingredients which were employed in each of the compositions and also includes similar compositions that were prepared with plain, untreated spent sulfite liquor, which purportedly has a stabilizing and conditioning effect on soil.

constituent is the reaction product between a lower alkylene chloride and a polyamine having the general formula:

$$H_2N-(C_nH_{2n}\overset{H}{N}-)_xH$$

wherein $n$ is an integer from 2 to 3 and $x$ has a numerical value of at least 2.

2. The composition of claim 1 containing between about 0.25 and 1.0 percent by weight of the treated precipitate based on the weight of the composition.

3. The composition of claim 1, wherein the polymeric alklene polyamine constituent of the precipitate is the reaction product between about equimolar quantities of ethylene dichloride and a mixture of polyamines that are homologous to diethylene triamine and that contains predominant proportions of diethylene triamine.

4. A composition in accordance with the composition set forth in claim 3 wherein the polymeric alkylene poly- Table.—*Preparation and evaluation of various stabilized clay soil compositions*

| Run | Material | Wt. of Stabilizing Solution used, gms. | Amount of Dry Clay used, gms. | Volume of Water used, ml. | Appearance of Composition on Drying | Results upon being immersed in water |
|---|---|---|---|---|---|---|
| A | Blank | | 50.0 | 15 | Hard | Disintegrated—5 minutes. |
| B | Caustic treated polymeric alkylene polyamine precipitate of lignin sulfonic acid. | 1.25 | 50.0 | 15 | Hard, Non-Friable | Slight surface sloughing first 5 minutes. Remained consolidated for about 2 hours. |
| C | do | 2.50 | 50.0 | 12 | do | Slight surface sloughing first 5 minutes. Could be removed from the water after 24 hours without crushing. |
| D | do | 5.0 | 50.0 | 10 | do | Do. |
| E | Spent sulfite liquor | 5.0 | 100.0 | | Crust on Top | Disintegrated—5 minutes. |
| F | do | 2.5 | 100.0 | | do | Do. |

Similar excellent consolidating effects may be achieved when other argillaceous soils are stabilized in the foregoing manner and when other forms of caustic treated and solubilized polymeric alkylene polyamine precipitates of lignin sulfonic acids within the comprehension of the invention are utilized.

What is claimed is:

1. Stabilized and hardened soil composition which comprises an argilliferous soil having incorporated therein a minor proportion of between about 0.25 and about 2.0 percent by weight, based on the weight of the composition, of a cementatory caustic treated and solubilized polymeric alkylene polyamine precipittae of lignin sulfonic acids in which precipitate the polymeric alkylene polyamine amine constituent has a molecular weight between about 250 and 1,000.

5. The composition of claim 1, wherein the precipitate contains between about 5 and 20 percent by weight of the polymeric alkylene polyamine constituent.

6. The composition of claim 1, wherein said precipitate is an aqueous sodium hydroxide treated and solubilized precipitate.

References Cited in the file of this patent

UNITED STATES PATENTS 2,375,019   Miller _____ May 1, 1945
2,710,255   Van Blaricon et al. _____ June 7, 1955